United States Patent

[11] 3,584,150

[72] Inventors Ronald A. Stordahl
1200 Taft Street, Thief River Falls, Minn. 56701;
Richard P. Halverson, 21 Barton Avenue S. E., Minneapolis, Minn. 55414

[21] Appl. No. 811,162
[22] Filed Mar. 27, 1969
[45] Patented June 8, 1971

[54] ELECTRONIC CIRCUITRY FOR KEYERS AND THE LIKE
11 Claims, 2 Drawing Figs.

[52] U.S. Cl. .......... 178/75, 307/269
[51] Int. Cl. .......... H04l 15/00
[50] Field of Search .......... 179/17.5, 75; 307/265, 269; 328/63

[56] References Cited
UNITED STATES PATENTS
3,504,200 3/1970 Avellar .......... 328/63 X

*Primary Examiner*—Kathleen H. Claffy
*Assistant Examiner*—William A. Helvestine
*Attorney*—Merchant & Gould

ABSTRACT: A timing chain including NOR circuits connected to provide a bistable binary action and a plurality of inverter switching circuits with RC time constants therein to provide a series of output pulses upon the receipt of a correct signal at an input of one of the NOR circuits. Said output pulses being applied to an input of a pair of bistable binary circuits, the outputs of which are connected to a NOR circuit. A pair of switches connected to inputs of one of the NOR circuits in the timing chain and to an input of one of the bistable binary circuits to provide at the output of the NOR circuit connected to the two binary circuits a first type of output signal (dot) upon the closure of the first switch and a second type of output signal (dash) upon the closure of the second switch. The circuitry further includes storage means comprising a pair of bistable binary circuits.

INVENTOR.
RONALD A. STORDAHL
RICHARD P. HALVERSON
BY
Merchant & Gould
ATTORNEYS

INVENTOR.
RONALD A. STORDAHL
RICHARD P. HALVERSON
BY
Merchant & Gould
ATTORNEYS

ELECTRONIC CIRCUITRY FOR KEYERS AND THE LIKE

BACKGROUND OF THE INVENTION

1. Field of the Invention

The present invention pertains to electronic circuitry useful in keying circuits for transmitting Morse and other types of code as well as in circuitry for practicing the various codes. The present circuitry is also useful in many electronic circuits where precisely spaced pulses of predetermined duration are required.

2. Description Of The Prior Art

In the prior art circuits designed for keying are either extremely complicated and expensive or so simple that they are unreliable. In prior art circuits errors occur during keying generally because the key is depressed for an improper period of time or at an improper period of time, such as during the formation of a previously keyed character.

SUMMARY OF THE INVENTION

The present invention pertains to electronic circuitry including timing means having an output connected to bistable binary circuit means which in turn have outputs connected through circuitry to the timing means so that complete output signals or characters are always formed and the input to the circuit does not require a specific duration.

It is an object of the present invention to provide new and improved electronic circuitry for the timing and formation of output pulses.

It is a further object of the present invention to provide a new and improved storage circuit for temporarily storing input signals applied thereto at an improper time.

It is a further object of the present invention to provide an improved electronic keying circuit utilizing the timing circuit and storage circuit to provide dependable keying.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
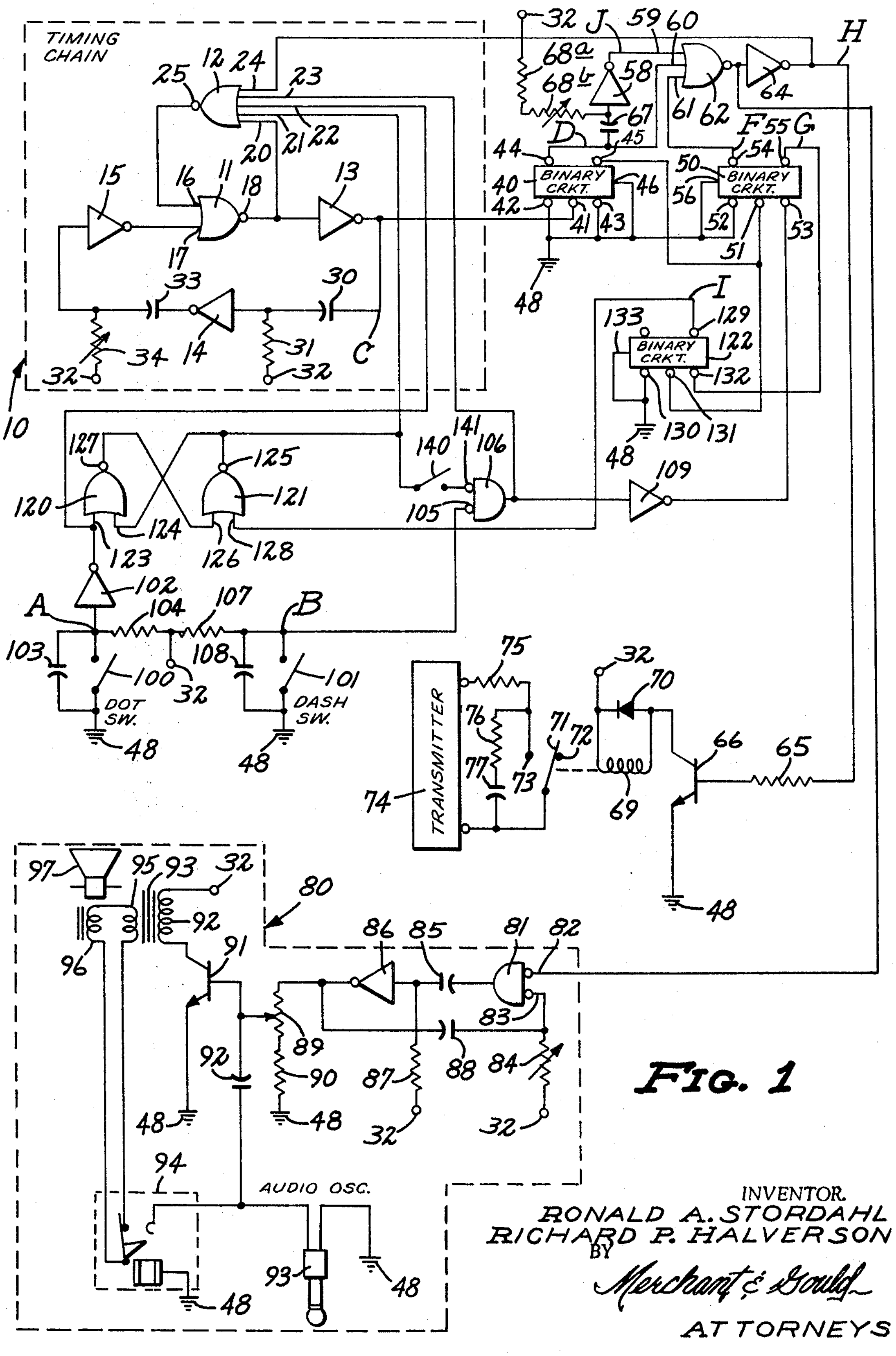
FIG. 1 is a diagram partially in schematic and partially in block illustrating the present circuitry.

In FIG. 1 the numeral 10 generally designates a timing chain including first and second NOR circuits 11 and 12, respectively, and three inverter switching circuits 13, 14 and 15. The first NOR circuit 11 has two input terminals 16 and 17 and an output terminal 18. The second NOR circuit 12 has five input terminals 20 through 24 and an output terminal 25. The output terminal 18 of the first NOR circuit 11 is connected to the input terminal 20 of the second NOR circuit 12. The output terminal 25 of the second NOR circuit 12 is connected to the input terminal 16 of the first NOR circuit 11. The output terminal 18 of the first NOR circuit 11 is also connected to the input of the inverter 13. The output of the inverter 13 is connected to one side of a capacitor 30 the other side of which is connected to the input of the inverter 14. A resistor 31 is connected between the input of the inverter 14 and a positive voltage supply 32 (not shown). The output of the inverter 14 is connected to one side of a capacitor 33 the other side of which is connected to the input of the inverter 15. A variable resistor 34 is connected between the input of the inverter 15 and the positive voltage supply 32. Capacitor 30 and resistor 31 form a first RC time constant and capacitor 33 and resistor 34 form a second RC time constant the operation of which will be described presently. The output of the inverter 15 is connected to the input 17 of the first NOR circuit 11 to complete the timing chain 10.

A first bistable binary circuit 40 has three inputs, a trigger input 41, a set input 42 and a clear input 43, and two outputs, a logic one output 44 and a logic zero output 45. The particular type of binary circuit 40 utilized in the present embodiment also has a preset input 46. A second bistable binary circuit 50 has three inputs, a trigger 51, a set input 52 and a clear input 53, and two outputs, a logic one output 54 and a logic zero output 55. The binary circuit 50 also has a preset input 56. The output of inverter 13 in the timing chain 10 is connected to the input 41, which is a trigger input, of the binary circuit 40. The inputs 42, 43 and 46 are connected to ground 48. The output 45 of the binary circuit 40 is connected to the input 51, which is a trigger input, of the binary circuit 50. The inputs 52 and 56 of the binary circuit 50 are connected to ground 48. The output 44 of the binary circuit 40 and the output 54 of the binary circuit 50 are connected to inputs 60 and 61, respectively, of a NOR circuit 62. An output 63 of the NOR circuit 62 is connected to the input of an inverter 64. The output of the inverter 64 is connected to the input 24 of the second NOR circuit 12 in the timing chain 10.

The NOR circuit 62 has a third input 59 which is connected to the output of an inverter circuit 58. The input of the inverter circuit 58 is connected through a capacitor 67 to the output 44 of the binary circuit 40. A fixed resistor 68*a* and a variable resistor 68*b* are connected in series between the input of the inverter 58 and the positive voltage supply 32. Many transmitters require, or have a built-in, lag at the beginning of transmission pulses. Because of this lag, or rounding, of the leading edge, some code characters, such as dots, become extremely narrow in width. To compensate for this problem capacitor 67, fixed resistor 68*a*, variable resistor 68*b* and inverter circuit 58 are placed in the circuit. These components add an adjustable additional length to the trailing edge of both dots and dashes, as will be explained presently. Thus, pulses are all increased a uniform amount of time, depending upon the setting of resistor 68*b*.

The output of the inverter 64 is also connected through a resistor 65 to the base of a transistor 66. The emitter of the transistor 66 is connected to ground 48 and the collector is connected through a relay coil 69 to the positive voltage supply 32. A diode 70 is connected in parallel with the relay coil 69 to reduce transients. The relay coil 69 causes a movable contact 71 to disengage a stationary contact 72 and engage a stationary contact 73 upon the energization thereof. The movable contact 71 is connected to one terminal of a transmitter 74 or the like and the stationary contact 73 is connected through a resistor 75 to a second terminal of the transmitter 74. The stationary contact 72 has no connection thereto. A resistor 76 and capacitor 77 are connected in series between the stationary contact 73 and the movable contact 71. The transmitter 74 is connected so that engagement of the movable contact 71 with the stationary contact 73 causes transmission therefrom. It should be understood that the transmitter 74 is illustrated only for exemplary purposes and is not a portion of or necessary to the present invention.

An audio oscillator generally designated 80 includes an AND circuit 81 having one input 82 connected to the output 63 of the NOR circuit 62. A second input 83 of the AND circuit 81 is connected through a variable resistor 84 to the positive voltage supply 32. The output of the AND circuit 81 is connected through a capacitor 85 to the input of an inverter 86. A resistor 87 is connected between the input of the inverter 86 and the positive voltage supply 32. A capacitor 88 is connected between the output of the inverter 86 and the input 83 of the AND circuit 81. The output of the inverter 86 is also connected to one side of a potentiometer 89. The opposite side of the potentiometer 89 is connected through a resistor 90 to ground 48. The movable contact of the potentiometer 89 is connected to the base of a transistor 91. The base of the transistor 91 is also connected to one side of a capacitor 92.

The other side of the capacitor 92 is connected to one terminal of a male phone plug 93. A second terminal of the male phone plug 93 is connected to ground 48. The other side of the capacitor 92 is also connected to one terminal of a female phone plug 94. The emitter of the transistor 91 is connected to ground 48 and the collector is connected through a primary winding 92 of a transformer 93 to a positive voltage supply which may be the positive voltage supply 32 if of the correct voltage. One side of a secondary winding 95 of the transformer 93 is connected to a second terminal of the female phone plug 94 and the other side is connected to one side of a voice coil 96 of a speaker 97. The other side of the voice coil 96 is connected to a third terminal of the female phone plug 94. The audio oscillator 80 is a straightforward oscillator which provides a tone upon the operation of the keying circuit to indicate to an operator the type of signal being produced. It should be understood that the audio oscillator is illustrated only for exemplary purposes and is not essential to the present circuit.

In the audio oscillator 80 the AND circuit 81, the timing circuit including capacitor 85 and resistor 87, the inverter 86 and the timing circuit including capacitor 88 and resistor 84 produce the audio tones. The width of each pulse produced by this oscillator is determined by the RC time constant of the capacitor 85 and the resistor 87 and the repetition rate, which determines the frequency or tone, is determined by the capacitor 88 and the variable resistor 84. The pulses or audio frequency produced are applied through the transistor 91 to the speaker 97 or through one of the phone plugs 93 and 94 so that the operator has an indication of the signal produced.

A first switch 100 and a second switch 101 form a key which the operator utilizes to produce the desired message. Normally the switches 100 and 101 will be embodied in a single key and substantially any of the various keys well known to those skilled in the art can be utilized. The movable contact of the switch 100 is connnected to ground 48 and the stationary contact is connected to the input of an inverter 102. A capacitor 103 is connected between the movable and stationary contacts of the switch 100 to suppress transient signals. A resistor 104 is connected from the input of the inverter 102 to the positive voltage supply 32. The movable contact of the switch 101 is connected to ground 48 and the stationary contact is connected to an input 105 of an AND circuit 106. The input 105 of the AND circuit 106 is also connected through a resistor 107 to the positive voltage supply 32. A capacitor 108 is connected between the movable and stationary contacts of the switch 101 to suppress transients and the like. The output of the inverter 102 is connected to the input 22 of the second NOR circuit 12 in the timing chain 10. The output of the AND circuit 106 is connected to the input 23 of the NOR circuit 12 in the timing chain 10 and to the input of an inverter 109, the output of which is connected to the input 53 of the binary circuit 50.

A dot storage circuit includes first and second NOR circuits 120 and 121 and a bistable binary circuit 122. The NOR circuit 120 has a first input 123, which is connected to the output of the inverter 102, and a second input 124, which is connected to an output 125 of the NOR circuit 121. The NOR circuit 121 has a first input 126, which is connected to an output 127 of the NOR circuit 120, and a second input 128, which is connected to a logic zero output 129 of the bistable binary circuit 122. The output 125 of the NOR circuit 121 is also connected to the input 21 of the second NOR circuit 12 in the timing chain 10. The bistable binary circuit 122 has a set input 130, and a preset input 133, which are connected to ground 48, a trigger input 131, which is connected to the output 45 of the binary circuit 40, and a clear input 132 which is connected to the output 55 of the binary circuit 50. The dot storage circuit also has a circuit for iambimation, which includes a switch 140 connected between the output 125 of the NOR circuit 121 and an input 141 of the AND circuit 106.

OPERATION

In general, the individual circuits described are switching circuits which are either conducting or nonconducting and which utilize and produce a high level signal, which may be defined as a logic one or true, or a low level signal, which may be defined as a logic zero or false. In the present embodiment a high level signal is similar in potential to the positive voltage supply 32 while the low level signal is similar in potential to the ground 48. However, it should be understood that the circuitry could be altered so that the high and low level signals might be potentially similar to the ground 48 and a negative supply, or any other combination desired. Each of the NOR circuits 11, 12, 62, 120, and 121 have a small circle at the output terminal indicating that logic inversion takes place there. Further, the circuits are such that if either or all of the inputs have a high level signal thereon, conduction occurs and the output is drawn down to a low level. If all of the inputs of a NOR circuit are at a low level no conduction occurs and the output is drawn down to a low level. If all of the inputs of a NOR circuit are at a low level no conduction occurs and the output is at the high level. Each of the inverter circuits 13, 14, 15, 16, 64, 86, 102 and 109 simply invert the signal applied to the input, or provide a signal at the output which is opposite in level to a signal applied at the input thereof. The AND circuits 81 and 106 both have small circles or logic inversion indicators at each of the inputs thereof, thereby indicating that negative signals are required on each of the inputs before conduction occurs therein.

In the normal or quiescent stage, that is with both of the switches 100 and 101 open, a high level signal is applied to the input of the inverter 102 and the input 105 of the AND circuit 106. Assuming that the iambimation switch 140 is open, a low level signal is applied to the input 141 of the AND circuit 106 so that a low level signal is prevalent at the output thereof and at the input 23 of the second NOR circuit 12. Since a high level signal is applied at the input of the inverter 102, a low level signal is prevalent at the output thereof and at the input 22 of the second NOR circuit 12. The low level signal prevalent at the output of the inverter 102 is also applied to the input 123 of the NOR circuit 120. The binary circuit 122 is normally in a state wherein a high level signal is provided at the output terminal 129 (as will become apparent presently) so that a high level signal is applied at the input 128 of the NOR circuit 121. Thus, a low level signal is prevalent on the output 125 of the NOR circuit 121 and on the input 21 of the second NOR circuit 12. The output of the inverter 64 is a low level signal, which is applied to the input 24 of the second NOR circuit 12. A low level signal is prevalent on the output 18 of the first NOR circuit 11, which is applied to the input 20 of the second NOR circuit 12. Since all of the inputs 20 through 24 of the second NOR circuit 12 have a low level signal applied thereto a high level signal is prevalent at the output 25, which is applied to the input 16 of the first NOR circuit 11. The low level signal prevalent on the output 18 of the first NOR circuit 11 is applied to the input of the inverter circuit 13 producing a high level signal at the output thereof. This high level signal is applied through the capacitor 30 to the input of the inverter 14, thereby, producing a low level signal at the output thereof. When the low level signal at the output of the inverter 14 is initially applied to the capacitor 33, it effectively passes therethrough and is applied to the input of the inverter 15. However, after a period of time determined by the RC constant of the capacitor 33 and resistor 34, the capacitor 33 charges so that a high level signal is applied to the input of the inverter 15. The high level signal at the input produces a low level signal at the output of the inverter 15 which is applied to the input 17 of the first NOR circuit 11.

The high level signal prevalent at the output of the inverter 13 is applied to the input 41, which is the trigger input, of the bistable binary circuit 40. The binary circuit 40 is the type known in the art as a J–K flip-flop, which toggles each time a negative-going signal is applied to the trigger input 41 if the inputs 42, 43 and 46 all have a low level signal present thereon. The circles at the inputs 41, 42 and 43 indicate that negative signals are required to activate the various circuits connected thereto. The circles at the output indicate that the output signals are inverted. Only the negative-going signal effects the binary circuit 40. Thus, in the normal condition a high level signal is applied to the trigger 41 and the binary circuit 40 remains in a normal state, which is a low level signal on the output 44 and a high level signal on the output 45. The bistable binary circuit 50 operates similar to the bistable binary circuit 40, and, thus, the high level signal prevalent on the output 45 of the binary circuit 40 has no effect when applied to the trigger input 51 thereof. Since both of the outputs 44 and 54 of the binary circuits 40 and 50 are at a low level the output 63 of the NOR circuit 62 has a high level signal thereon, which high level signal when applied to the inverter 64 produces the low level signal at the output previously mentioned. The high level signal prevalent on the output 45 of the binary circuit 40 is applied to the trigger input 131 of the binary circuit 122 and has no effect therein, so that the output 129 has a high level signal thereon as previously described.

Figure 2:
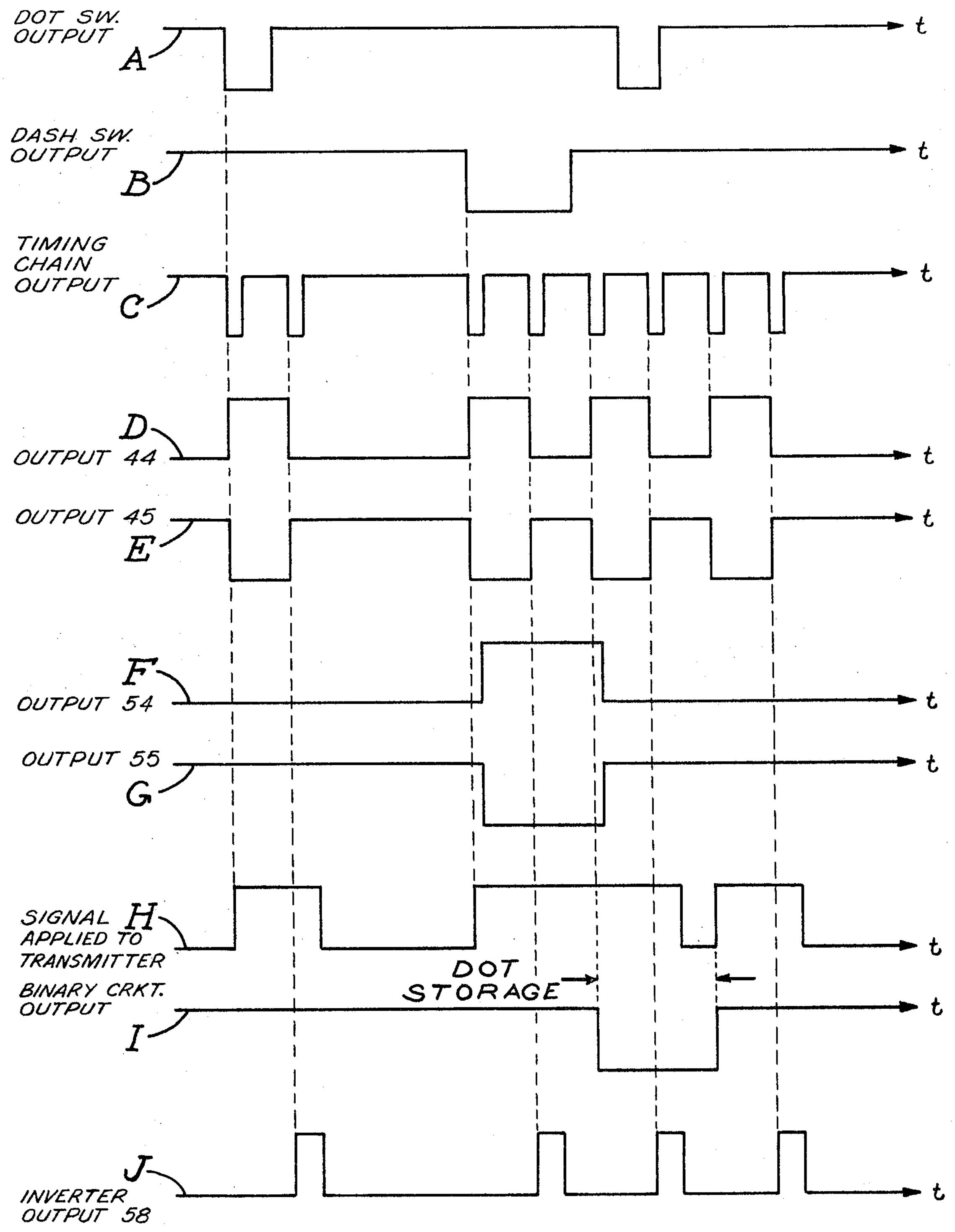
FIG. 2 is a diagram illustrating various approximate wave forms at designated points in the circuitry of FIG. 1 and their approximate time relationship.

Upon the closure of switch 100, as indicated by the negative-going pulse in the series of pulses designated "A" of FIG. 2, the inverter 102 inverts the signal and applies a high level signal to the input 22 of the second NOR circuit 12. Since one of the inputs of the second NOR circuit 12 has a high level signal thereon, the output 25 of the NOR circuit 12 and the input 16 of the NOR circuit 11 have a low level signal thereon, which in conjunction with the low level signal on the input 17 produce a high level signal at the output 18 of the NOR circuit 11. The high level signal at the output 18 of the NOR circuit 11 is applied to the input 20 of the NOR circuit 12 and the input of the inverter 13. The high level signal on the input 20 of the NOR circuit 12 maintains the NOR circuit 12 conducting even after the switch 100 is opened. This signal at the input 20 assures that all pulses and spaces therebetween appearing at the output of the inverter 13 are of uniform length or duration.

The high level signal at the input of the inverter 13 provides a low level signal at the output thereof which is applied to the trigger input 41 of the binary circuit 40. When the negative-going signal is applied to the trigger input 41 the binary circuit 40 toggles, whereby, the signal at the output 44 changes to a high level and the signal at the output 45 changes to a low level (see the pulse series D and E of FIG. 2). The high level signal at the output 44 of the binary circuit 40 is applied to the input 60 of the NOR circuit 62, thereby, producing a low level signal at the output 63 thereof. This low level signal is inverted in the inverter 64 and applied to the input 24 of the NOR circuit 12 to maintain the timing chain 10 in operation until the character is completed. The high level signal from the inverter 64 is also applied to the base of the transistor 66 to cause conduction thereof and energize the relay coil 69 to key the transmitter 74.

Since a high level signal is still being applied to the clear input 53 of the binary circuit 50 through the AND circuit 106 and inverter circuit 109, the negative-going pulse from the output 45 applied to the trigger input 51 of the binary circuit 50 does not change the state thereof. Further, since the output terminal 55 of the binary circuit 50 still has a high level signal prevalent thereon, which is applied to the input 132 of the binary circuit 122, the negative-going pulse applied to the trigger input 131 thereof does not change the state thereof.

After a period of time determined by the time constant of the capacitor 30 and the resistor 31, the capacitor 30 charges to approximately the potential of the positive voltage supply 32 and produces a negative signal at the output of the inverter 14. In the present embodiment the capacitor 30 has a value of approximately 0.56 $\mu$ and the resistor 31 has a value of approximately 39K ohms so that the time constant is approximately 20 msec. The low level signal at the output of the inverter 14 is applied through the capacitor 33 to the input of the inverter 15 and produces a high level signal at the output thereof. The high level signal at the output of inverter 15 is applied to the input 17 of the NOR circuit 11 to produce a low level signal at the output 18 thereof. This low level signal is inverted in the inverter 13 to complete an output pulse, and applied to the trigger input 41 of the binary circuit 40, which does not affect the binary circuit 40.

After a predetermined period of time, determined by the size of the capacitor 33 and resistor 34, the capacitor 33 charges to approximately the potential of the positive voltage supply 32 and this high level signal is applied to the input of the inverter 15. The low level signal at the output of the inverter 15 is applied to the input terminal 17 of the NOR circuit 11 to produce a high level signal at the output 18 thereof. Since the binary circuit 40 has not been toggled, the output of the NOR circuit 62 is a low level signal and the output of the inverter circuit 64 is a high level signal, which is applied to the input 24 of the NOR circuit 12 to produce a low level signal at the output 25 thereof and at the input 16 of the NOR circuit 11. Thus, since both inputs 16 and 17 of the NOR circuit 11 are at a low level, the signal at the output 18 is at a high level as described. The high level signal at the output 18 of the NOR circuit 11 is applied to the inverter circuit 13 which applies a low level signal to the trigger input 41 of the binary circuit 40. As the signal at the trigger input 41 goes negative the binary circuit 40 toggles and the signals at the outputs 44 and 45 reverse levels. The positive-going signal at the output 45 is applied to the trigger inputs 51 and 131 of the binary circuits 50 and 122, respectively, where no change occurs. The low level signal at the output 44 is applied to the input 60 of the NOR circuit 62 and, in conjunction with the low level signal on the input 61, produces a high level signal at the output 63. The high level signal produces a low level at the output of the inverter 64, which produces nonconduction in the transistor 66 to shut off the transmitter 74. Thus, a dot (as seen by the first pulse in the series H of FIG. 2) is transmitted.

It should be noted that the timing chain 10 produces two full pulses (see series C of FIG. 2) for each dot transmitted, and a subsequent character cannot be started for a period of time equal to the time required for the timing chain 10 to produce another pulse. Thus, a complete character includes the dot, or dash, and the nontransmission period, equal in time to a dot, immediately thereafter. The timing circuit including capacitor 30 and resistor 31 determine the width of each of these pulses and the timing circuit including capacitor 33 and resistor 34 determine the repetition rate or distance between the pulses. In the present embodiment the capacitor 33 may have a value of approximately 6.8 $\mu$ and the resistor 34, which is a variable resistor, may have a maximum value of approximately 50K ohms. Thus, the period of time between pulses produced by the timing chain 10 may be varied between approximately 40 and 400 msec. After the second pulse of the timing chain 10 is completed, it returns to the normal or quiescent state previously described and the entire circuit is ready for the next closure of either of the switches 100 or 101.

It should be noted that the NOR circuits 11 and 12 are connected to form a bistable binary circuit with a plurality of inputs. Also, inverters 13, 14 and 15 and the shared portion of NOR circuit 11 (input 17 and output 18 of NOR circuit 11 look somewhat like an inverter circuit to the remainder of the circuit) are connected in a ring to form an astable binary circuit. Thus, an astable binary circuit and a bistable binary circuit are provided and connected to interact so as to produce pulses and spaces having uniform duration. Each time a proper signal is applied to either of the inputs 21, 22, 23 or 24 the timing chain 10 is activated. With the production of a first pulse at the output of the inverter 13 the binary circuit 40, NOR circuit 62 and inverter circuit 64 apply a signal to the input 24 to continue the operation of the timing chain 10 until a complete character (dot and space, or dash and space) is completed.

Signals at the output 44 of the binary circuit 40 are also applied through the capacitor 67 to the input of the inverter 58.

The input of the inverter is normally a high level signal. Thus, when the signal level at the output 44 is high it has no effect on the inverter 58. However, when the binary circuit 40 toggles and the signal at the output 44 goes in a negative direction, the input of the inverter 58 goes sharply negative after which the capacitor slowly charges until the signal at the input of the inverter 58 reaches the switching threshold. These signals result in a positive pulse at the output of the inverter 58 (see series J, FIG. 2) which is applied to the input 59 of the NOR circuit 62. The width of these pulses can be varied, by adjusting the resistor 68*b*, between a maximum value less than the duration of a dot and a minimum value greater than zero. Since both dots and dashes (as will be explained presently) end with the output 44 64 from a high to a low level, both are lengthened an equal amount.

When the switch 101 is closed temporarily by the operator a negative pulse or low level signal (see series B of FIG. 2) is applied to the input 105 of the AND circuit 106. Assuming that the iambimation switch 140 is open, a low level signal is also prevalent on the input 141 so that a high level signal appears at the output of the AND circuit 106. This high level signal is applied to the input 23 of the NOR circuit 12 in the timing chain 10. Since one of the inputs of the NOR circuit 12 is now at a high level the output 25 has a low level signal thereon and the timing chain 10 begins the previously described process of producing pulses as indicated in series C of FIG. 2. These pulses are applied to the trigger input 41 of the binary circuit 40 as previously described to produce the pulses illustrated in series D and E of FIG. 2 at the outputs 44 and 45, respectively.

The high level signal produced by the AND circuit 106 is simultaneously applied to the inverter 109 which produces a low level signal that is applied to the clear input 53 of the binary circuit 50. Thus, when the binary circuit 40 is toggled by the first pulse from the timing chain 10, a negative-going signal is applied to the trigger input 51 of the binary circuit 50 from the output 45 of the binary circuit 40. Since the inputs 52, 53 and 56 are now all negative the negative-going pulse on the trigger input 51 toggles the binary circuit 50 so that the output 54 has a high level signal thereon and the inputs 60 and 61 of the NOR circuit 62 have high level signals thereon and the output 63 has a low level signal thereon which is inverted by the inverter 64 and utilized to turn on the transmitter 74.

When the timing chain 10 applies the second pulse to the trigger input 41 the binary circuit 40 toggles to reverse the levels of the signals on the outputs 44 and 45 thereof. Since the input 61 of the NOR circuit 62 has a high level signal thereon, the application of a low level signal to the input 60 has no effect. Further, since the signal at the output 45 is going positive, the application thereof to the trigger input 51 of the binary circuit 50 has no effect and the outputs thereof remain constant.

When the third pulse is applied to the trigger input 41 from the timing chain 10 the binary circuit 40 toggles and a high level signal appears at the output 44 while a low level signal appears at the output 45. Thus, the output 45 applies a negative-going signal to the trigger input 51 to toggle the binary circuit 50. Upon toggling the output 54 changes to a low level signal and the output 55 changes to a high level signal. Because the output of the binary circuit 40 toggles the binary circuit 50, there is a slight delay between the outputs thereof and a high level signal appears at the output 44 prior to the disappearance of the high level signal on the output 54 and the NOR circuit 62 is maintained in a conducting state so that the output 63 has a continuous low level signal thereon.

The fourth pulse from the timing chain 10 applied to the trigger input 41 again toggles the binary circuit 40 to change the levels of the signals prevalent at the outputs 44 and 45. As the binary circuit toggles the fourth time both inputs 60 and 61 of the NOR circuit 62 have a low level signal thereon so that the output 63 has a high level signal thereon which is inverted in the inverter 64 to shut off the transmitter 74. Thus, a dash (see series H of FIG. 2) is produced which is three times as long as a dot. Upon completion of the dash the entire circuit returns to the normal state and is again ready for the closure of one of the switches 100 or 101.

Generally operators of the telegraph keys and the like have a tendency to automatically close the dash switch (switch 101 in this disclosure) for a much greater period of time than they close the dot switch (switch 100 in this disclosure). Because of this habit or mannerism and because electronic keyers are generally still in the process of producing a dash after the dash switch is opened, closure of the dot switch immediately after closure of the dash switch may result in the loss of a dot in the output signal. To rectify this problem he dot storage means including binary circuit 122 and NOR circuits 120 and 121, connected to operate as a binary circuit, are connected in the present circuitry. Because the dash switch 101 will normally be closed for a substantial portion of the time required to actually transmit a dash, the dot storage means is only in operation for the last half of the entire dash, which is the last one-third of the positive pulse and the space following the positive pulse or for a period of time equal to two dots (see FIG. 2).

In the description of the production of a dash it should be remembered that four complete pulses are produced by the timing chain 10 to toggle the binary circuit 40 four times (see FIG. 2). When the binary circuit 40 is toggling for the third time the output 44 is a positive-going signal while the output 45 is a negative-going signal. Simultaneously the output 55 of the binary circuit 50 is a low level signal, because the negative-going signal from the output 45 is in the process of toggling the binary circuit 50 but there is a delay therein. Thus, the inputs 130, 132 and 133 of the binary circuit 122 all have a low level signal thereon and the trigger input 131 has a negative-going signal thereon, which causes the binary circuit 122 to toggle (see series I of FIG. 2). The output 129 of the binary circuit 122 normally has a high level signal thereon and upon toggling the signal changes to a low level. This low level signal is applied to the input 128 of the NOR circuit 121. The binary circuit 122 remains in the state described until the binary circuit 40 produces a second negative-going signal at the output 45 thereof. The construction and electrical connection of the binary circuit 122 is such that the next negative-going pulse on the trigger input 31 will return the binary circuit 122 to the normal position regardless of the level of signal on the input 132.

With the storage means in the state described above, closing switch 100, which results in the application of a high level signal to the input 123 of the NOR circuit 120, provides a low level signal on the other input 126 of the NOR circuit 121 to produce a high level signal at the output 125 thereof. The high level signal at the output 125 is applied to the input 124 of the NOR circuit 120 to maintain a low level signal at the output 127 thereof. Thus even though the switch 100 is opened a high level signal remains at the output 125 until the binary circuit 122 changes state. This high level signal at the output 125 is applied to the input 21 of the NOR circuit 12 to start the timing chain 10. As indicated in FIG. 2 the timing chain 10 produces a fifth pulse which toggles the binary circuit 40 to change the state of the binary circuit 122. Thus, even though the switch 100 is operated while the circuit is in the process of producing a dash, the storage means retains the signal and produces a dot at the correct time after the dash is completed.

Closure of the iambimation switch 140 applies the signal at the output 125 of the NOR circuit 121 to the input 141 of the AND circuit 106. Iambimation, which is a series of alternate dots and dashes, occurs when the switch 140 is closed and both of the switches 100 and 101 are closed simultaneously. It can be seen that the dash will be produced as described above and the dots, which will be stored in the storage means, will follow at the correct time automatically.

Thus, electronic circuitry has been disclosed which is useful to provide an electronic keyer or the like and which produces signals that are extremely accurate and reliable. In addition to being uniform in time and space the present circuitry prevents the inadvertent loss of signal information, such as dots, following other information such as dashes or the like.

What we claim is:

1. Electronic circuitry comprising:

a. timing means having a plurality of inputs and an output for providing a series of pulses at the output when a signal is applied to at least one of the inputs;

b. a plurality of bistable binary circuit means each having a plurality of inputs and a plurality of outputs and having one of the inputs of at least one of said plurality of bistable means connected to the output of said timing means; and c. connecting means connected to one output of each of at least two of the said plurality of binary circuit means, and one of the inputs of said timing means for supplying a signal to said timing means when said binary circuit means are providing output signals.

2. Electronic circuitry as set forth in claim 1 including in addition switch means and associated connecting means for connecting said switch means to two inputs of the timing means and to one input of the binary circuit means.

3. Electronic circuitry as set forth in claim 2 including in addition storage means having an output connected to an input of the timing means and a plurality of inputs connected to outputs of the binary circuit means and the connecting means associated with the switch means.

4. Electronic circuitry as set forth in claim 3 including in addition means for connecting the output of the storage means to the connecting means associated with the switch means to provide iambimation.

5. Electronic circuitry as set forth in claim 1 wherein the connecting means includes pulse forming means for adding a variable additional length onto each pulse at the output thereof.

6. Electronic circuitry as set forth in claim 5 wherein the connecting means includes a NOR circuit having a plurality of inputs, two of said inputs being connected to first and second outputs of the binary circuit means, and the pulse forming means includes an inverter circuit having an output connected to a third input of said NOR circuit and an input connected through a timing network to the first output of the binary circuit.

7. Electronic circuitry comprising:

a. a first NOR switching circuit having two inputs and an output, said first NOR circuit providing a high level output signal upon receiving a low level input signal on both of the two inputs and providing a low level output signal upon receiving a high level input signal on at least one of the two inputs;

b. a second NOR switching circuit having an output connected to one of the inputs of said first NOR circuit and at least two inputs, said second NOR circuit operating similar to said first NOR circuit, and said second NOR circuit having one input connected to the output of said first NOR circuit;

c. first, second and third inverter switching circuits each having an input and an output and, upon receiving a signal at the input, providing a signal at the output of the opposite level;

d. a first timing circuit having an input connected to the output of said first inverter circuit and an output connected to the input of said second inverter circuit and providing a high level signal at the output thereof a predetermined time after receiving a low level signal at the input thereof;

e. a second timing circuit having an input connected to the output of said second inverter circuit and an output connected to the input of said third inverter circuit and providing a high level signal at the output thereof a predetermined time after receiving a low level signal at the input thereof; and f. the output of said third inverter circuit being connected to the other input of said first NOR circuit and the input of said first inverter circuit being connected to the output of said first NOR circuit to complete a timing chain for producing timing pulses.

8. Electronic circuitry as set forth in claim 7 wherein the first and second timing circuits include RC networks.

9. Electronic circuitry as set forth in claim 7 having in addition first and second switch means connected to second and third inputs of said second NOR circuit respectively, a first bistable binary circuit having an input connected to the output of said first inverter circuit and an output, and a second bistable binary circuit having a first input connected to the output of said first binary circuit and a second input connected through connecting means to the second switch means, said first and second binary circuits providing a first output signal upon the activation of said first switch and a second output signal upon the activation of said second switch.

10. Electronic circuitry as set forth in claim 9 having in addition storage means for storing signals from the first switch means, said storage means being connected to the first switch means and the first and second binary circuits, and an output of said storage means being connected to an input of the second NOR circuit.

11. Electronic circuitry as set forth in claim 9 wherein the first and second binary circuits each have an output and the electronic circuitry further includes circuit means for operating a transmitter which circuit means are attached to said outputs of said binary circuits.